(12) United States Patent
Sanders et al.

(10) Patent No.: US 12,001,527 B2
(45) Date of Patent: Jun. 4, 2024

(54) SELECTIVE SECURING OF COMPUTING DEVICES WITH DOCKING STATIONS

(71) Applicant: Hewlett-Packard Development Company, L.P., Spring, TX (US)

(72) Inventors: Aaron Sanders, Spring, TX (US); William Scott Gregory, Spring, TX (US); Scott N. McCammon, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 421 days.

(21) Appl. No.: 17/276,839

(22) PCT Filed: Dec. 5, 2018

(86) PCT No.: PCT/US2018/064046
§ 371 (c)(1),
(2) Date: Mar. 17, 2021

(87) PCT Pub. No.: WO2020/117227
PCT Pub. Date: Jun. 11, 2020

(65) Prior Publication Data
US 2021/0349978 A1 Nov. 11, 2021

(51) Int. Cl.
*G06F 9/54* (2006.01)
*G06F 13/40* (2006.01)
(Continued)

(52) U.S. Cl.
CPC ............... *G06F 21/31* (2013.01); *G06F 9/54* (2013.01); *G06F 13/4068* (2013.01); *G06F 21/572* (2013.01); *G06F 21/85* (2013.01)

(58) Field of Classification Search
CPC ...... G06F 13/4068; G06F 21/85; G06F 21/88; G06F 21/572; G06F 9/54; G06F 21/31
See application file for complete search history.

(56) References Cited

U.S. PATENT DOCUMENTS

| 5,878,211 | A  | 3/1999  | Delagrange et al. |
| 6,331,934 | B1 | 12/2001 | Helot et al.      |

(Continued)

FOREIGN PATENT DOCUMENTS

| WO | WO-2018008937 A1 * | 1/2018 | ............. G06F 21/31 |
| WO | WO-2018048436 A1 * | 3/2018 | ......... E05B 73/0082 |

OTHER PUBLICATIONS

"The System Can Be Removed from the Docking Station Without Logging on First"—STIG Viewer, UCF, Jun. 2017 https://www.stigviewer.com/stig/windows_2008_member_server/2017-06-09/finding/V-3372 (Year: 2017).*

(Continued)

*Primary Examiner* — Randy A Scott
(74) *Attorney, Agent, or Firm* — Knobbe, Martens, Olson & Bear, LLP (57) ABSTRACT

A method of selectively securing a computing device at a docking station may include creating a security key between a security application programming interface (API) and an application executed on the computing device; upon logging into and execution of a basic input/output system (BIOS) of the computing device by a user, registering the application with the security API using the security key; and, upon receipt of a request to remove the computing device from the docking station, validating the user is authorized to remove the computing device from the docking station based on settings associated with the application.

15 Claims, 3 Drawing Sheets

(51) Int. Cl.
    *G06F 21/31*     (2013.01)
    *G06F 21/57*     (2013.01)
    *G06F 21/85*     (2013.01)

(56) References Cited

U.S. PATENT DOCUMENTS

| | | |
|---|---|---|
| 9,927,838 B2 * | 3/2018 | Vroom .................... G06F 21/88 |
| 2008/0209965 A1 | 9/2008 | Maack |
| 2009/0158423 A1 * | 6/2009 | Orlassino ................ G06F 21/32 |
| | | 726/19 |
| 2010/0085701 A1 | 4/2010 | Nielsen et al. |
| 2013/0198867 A1 | 8/2013 | Ricci et al. |
| 2014/0362517 A1 | 12/2014 | Moock et al. |
| 2015/0286252 A1 | 10/2015 | Barone et al. |
| 2017/0177029 A1 | 6/2017 | Nguyen et al. |
| 2019/0370506 A1 * | 12/2019 | Schramm ................ G06F 21/32 |

OTHER PUBLICATIONS

"Dell Intentionally Disables Rear USB Ports When Docked"—Spiceworks Community, Spiceworks, Aug. 2015 https://community.spiceworks.com/t/dell-intentionally-disables-rear-usb-ports-when-docked/430943 (Year: 2015).*

* cited by examiner

SELECTIVE SECURING OF COMPUTING DEVICES WITH DOCKING STATIONS

BACKGROUND

Computing devices may be secured any number of ways in order to prevent both the theft of the data maintained thereon as well as the hardware of the computing device itself. One such way to prevent this theft is to couple, physically, the computing device to a docking station. The docking station may prevent the decoupling of the computing device therefrom unless, for example, a key is used to physically unlock the computing device from the docking station.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Docking stations for computing devices selectively prevent computing devices from being removed therefrom. In an example, a physical lock may secure the computing device, physically, to the docking station. Without the physical key, a user may not be allowed to remove the computing device from the docking station. However, this limitation prevents those who may actually have authority to remove the computing device from the docking station from doing so without a physical key. Furthermore, some users may not have authority to remove the computing device from the docking station under some circumstances but may have such authority under other circumstances. Having such restrictions placed on the removal of the computing device from the docking station provides functional limitations on the system as a whole.

In order to increase the functionality of the system that includes the computing device and docking station, any physical security device may be augmented with a hardware and/or computer executable program code in order to increase this functionality. Such augmentations may allow for relatively more robust security augmentations in the system, increase or decrease the access to certain hardware of the computing device such as input/output (I/O) ports, and increase or decrease the access to executable program code on the computing device. The present specification describes a computing device that includes an application programming interface (API) that reviews customized settings associated with an application executed on the computing device and overrides a physical lock where those settings dictate such authority to override exist. These settings, in any example presented herein, may be docking station specific, location specific, user specific, and/or executed application specific.

The present specification describes a method of selectively securing a computing device at a docking station, including creating a security key between a security application programming interface (API) and an application executed on the computing device; upon logging into and execution of a basic input/output system (BIOS) of the computing device by a user, registering the application with the security API using the security key; and, upon receipt of a request to remove the computing device from the docking station, validating the user is authorized to remove the computing device from the docking station based on settings associated with the application.

The present specification also describes a docking station interface system, including a computing device comprising a processor, the computing device selectively and physically couplable to a docking station; an application executed by the processor; and a secure application programming interface (API) to create a security key to be used among the secure API and the application executed by the processor; wherein upon logging into and execution of a basic input/output system (BIOS) of the computing device by a user the secure API registers the application with the secure API using the security key; and wherein, upon receipt of a request to remove the computing device from the docking station, validating that the user is authorized to remove the computing device from the docking station based on settings associated with the application.

The present specification further describes a non-transitory computer readable storage medium comprising computer usable program code embodied therewith, the computer usable program code to, when executed by a processor: create a security key between a security application programming interface (API) and an application executed on the computing device; upon logging into and execution of a basic input/output system (BIOS) of the computing device by a user, register the application with the security API using the security key; and upon receipt of a request to remove the computing device from the docking station, validate the user is authorized to remove the computing device from the docking station based on settings associated with the application.

As used in the present specification and in the appended claims, the term "application programming interface (API)" is meant to be understood as computer executable program code that defines certain set(s) of subroutine definitions, communication protocols, and/or tools that interfaces a basic input/output system (BIOS) with an application being executed by a processor of a computing device.

Figure 1:
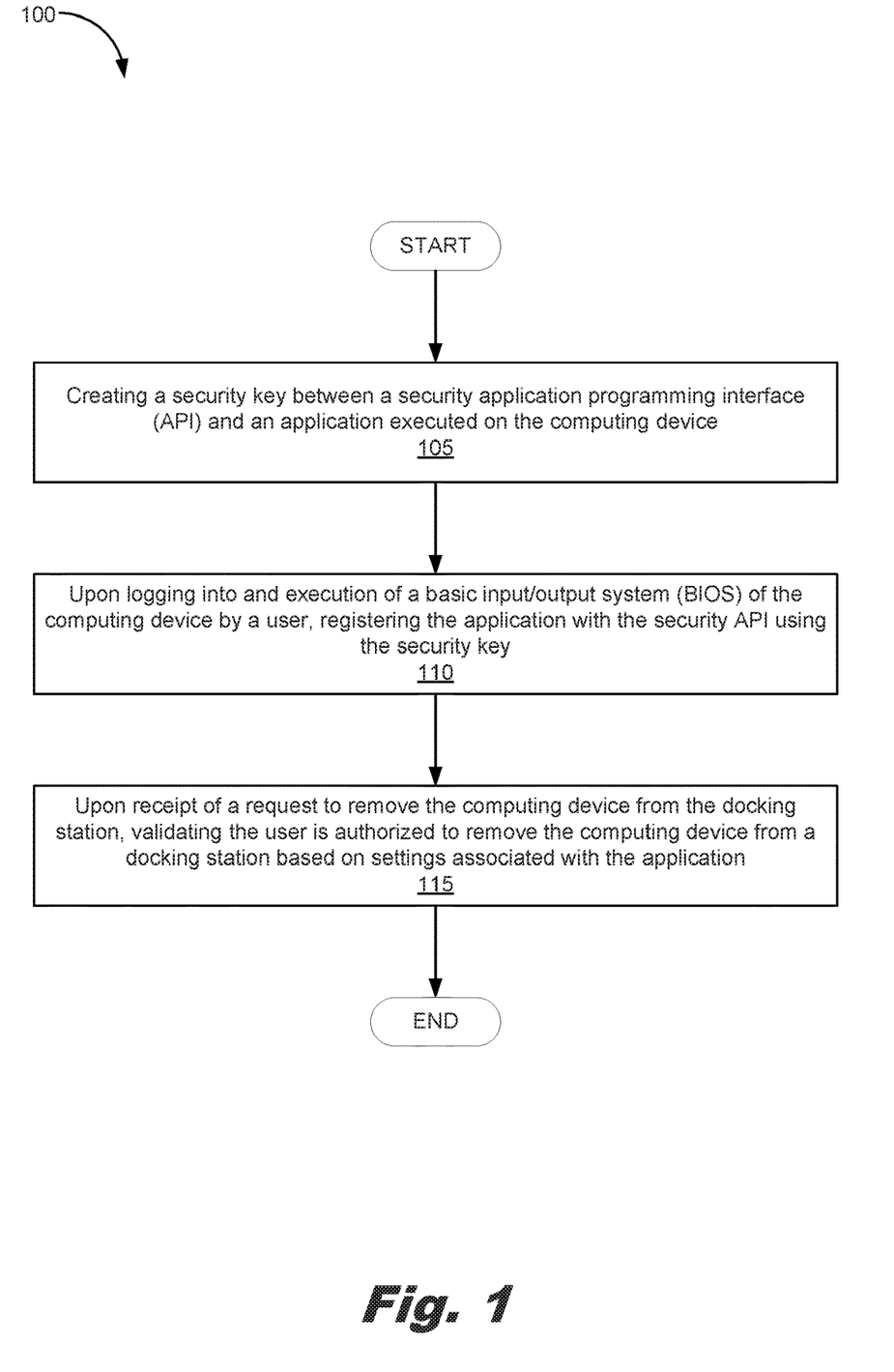
FIG. 1 is a flowchart depicting a method of selectively securing a computing device at a docking station according to an example of the principles described herein.

Turning now to the figures, FIG. 1 is a flowchart depicting a method (100) of selectively securing a computing device at a docking station according to an example of the principles described herein. The method (100) may include creating (105) a security key between a security application programming interface (API) and an application executed on the computing device. The creation (105) of the security key allows authentication between the BIOS/application programming interface (API) and an application executed on the computing device. In an example, the security key may be associated with a specific user as logged into the computing device. This alone or along with settings associated with the application, may dictate whether a user may be authorized to decouple the computing device from the docking station. In an example, the security key may be created for each and any user when the application is uploaded to the computing device. In an example, the security key may be created when a user creates a sign-in credential on the computing device.

The method (100) may include, upon logging into and execution of a basic input/output system (BIOS) of the computing device by a user, registering (110) the application with the security API using the security key. Registration (110) of the application with the security API allows the computing device to recognize the correct security key associated with the specific user who has logged into the BIOS of the computing device. This security key may be used later in the process to determine whether and how the user has authority to interact with the computing device and/or docking station.

The method (100) may also include, upon receipt of a request to remove the computing device from the docking station, validating (115) the user is authorized to remove the computing device from the docking station based on settings associated with the application. As described herein the security key associated with a user may allow the user and/or an administrator to associated a number of settings associated with the application or any application being executed on the computing device. These settings may include any number of if/then rules that set standards as to when and if any specific user may remove the computing device from the docking station. Thus, based first on the security key being registered with the BIOS of the computing device and then the specific settings associated with a user and the application the user is having executed on the computing device, a user may or may be prevented from removing the computing device from the docking station.

By way of example, the computing device may be used at point of sale (POS) scenario. The computing device, in such a location as a POS, may be secured to a docking station in order to prevent theft of the computing device. In this specific example, the computing device may be coupled to the docking station using some mechanical device such as a locking pin. In an example, this mechanical device may be coupled to a motor that is capable of actuating the mechanical device so that the computing device may be removed from the docking station without the use of, for example, a physical key.

During use of the computing device at the POS, the user may interface with the computing device executing a POS application. As described herein, the POS application may have registered (110) with the security API using the security key when the user has logged into the computing device and/or POS application and when the BIOS has been executed by a processor of the computing device. During execution of the POS application, the BIOS may be updated with the security key so that the POS application and its associated settings (i.e. if/then rules) may be used during operation of the computing device by the user.

The user, in an example, may execute a request to release or otherwise decouple the computing device from the docking station. This request may be created as a result, in an example, of the user pressing a button on either the docking station or computing device. In another example, the user may interface with a graphical user interface presented on a screen or display device of the computing device so as to cause the release or decoupling signal to be sent to the processor or the computing device. In either example, the security API may send a notification to the POS application registered with the BIOS of the computing device.

The POS application may then indicate the authenticity of the user and consult the settings associated with that POS application to determine whether the user is authorized to remove the computing device from the docking station. The settings may selectively prevent the user from removing the computing device based on the time of day, whether the user is allowed to remove the computing device because the POS application is being executed (or any other application), and where the computing device is currently located (i.e., which among a plurality of docking stations the computing device is coupled to), among other criteria. Any other type of setting may be initiated and crafted by, for example, an administrator so that any myriad of conditions is present in order for the user to be authorized to remove the computing device.

Where the user is not authorized to remove the computing device from the docking station based on the herein-described criteria, the user may be notified. Such a notification may be in the form of an auditory or visual output from either the computing device and/or docking station. In an example, a visual cue in the form of an illuminated button may be presented to the user indicating, in the color red for example, that the user is not allowed to detach or uncouple the computing device from the docking station. In this example, the mechanical device locking the computing device to the docking station is not deactivated maintaining a secured state of the computing device to the docking station.

Where the user is authorized to remove the computing device from the docking station based on the herein-described criteria, other auditory and/or visual outputs may be presented to the user. When the user is so notified that the user is authorized to remove the computing device from the docking station, the user may pull the computing device away from the docking station rendering the computing device mobile. In an example, the mechanical device securing the computing device to the docking station may be activated so that the mechanical device is no longer securing the computing device to the docking station.

When the computing device is removed by the user from the docking station, the application (in this example the POS application) may be notified of the removal of the computing device. Additional notifications may be presented to the application being executed at any time and state of the computing device. By way example, the security API may notify the POS application of the docking state of the computing device: i.e., docked, not docked, or docking jam detected. In an example, the security API may notify the POS application of the secured state of the computing device to the docking station: i.e., locked to the docking station or unlocked but affixed to the docking station. In an example, the security API may notify the POS application of the identification or serial number associated with the docking station to which the computing device is physically coupled to and/or communicatively coupled to.

In the example where the POS application is being executed, certain ports may be selectively secured from access by the user. In a specific example, the POS application may prevent a user from accessing a USB port that is tied to a cash drawer. In this example, the settings associated with the POS application may indicate that the user has access to remove the computing device from the docking station but does not have access to, via the USB port, open a cash drawer associated with that docking station. This may limit the access to a specific drawer of cash to a specific employee (i.e., user) within a workforce. Additional limitations may be added, via the POS application, that limit or describe the user's ability to interact with any peripheral device communicatively coupled to the computing device either directly to a port on the computing device itself or through a port on the docking station. In this example, the POS application may be notified of the presence of a port and whether any available ports are enabled or disabled based on the settings associated with the user and the POS application. In any of these examples, the port may be selectively rendered accessible or inaccessible to any specific user under any specific settings (i.e., if/then rules) associated with any of the applications executed on the computing device.

In some examples, multiple docking stations may exist within a certain environment. In this example, one of the settings associated with the application and checked by the security API may adjust a user's authority based on the location of the docking station. Continuing with the POS application example being executed on the computing device, when the computing device is removed from one docking station and moved to another, the authority to conduct certain takes by the user may be increased or decreased. In a specific case where the computing device is used as a telling machine, by removing the computing device from one docking station to a separate docking station may prevent or allow a user to access a cash drawer associated with the separate docking station.

Through the use of the security API that interfaces with the application being executed on the computing device, the security of the physical hardware of the computing device and/or the data maintained on the computing device may be better controlled. Indeed, any number of conditions may be set via these settings thereby increasing the flexibility and functionality of the computing device and docking station during use.

Figure 2:
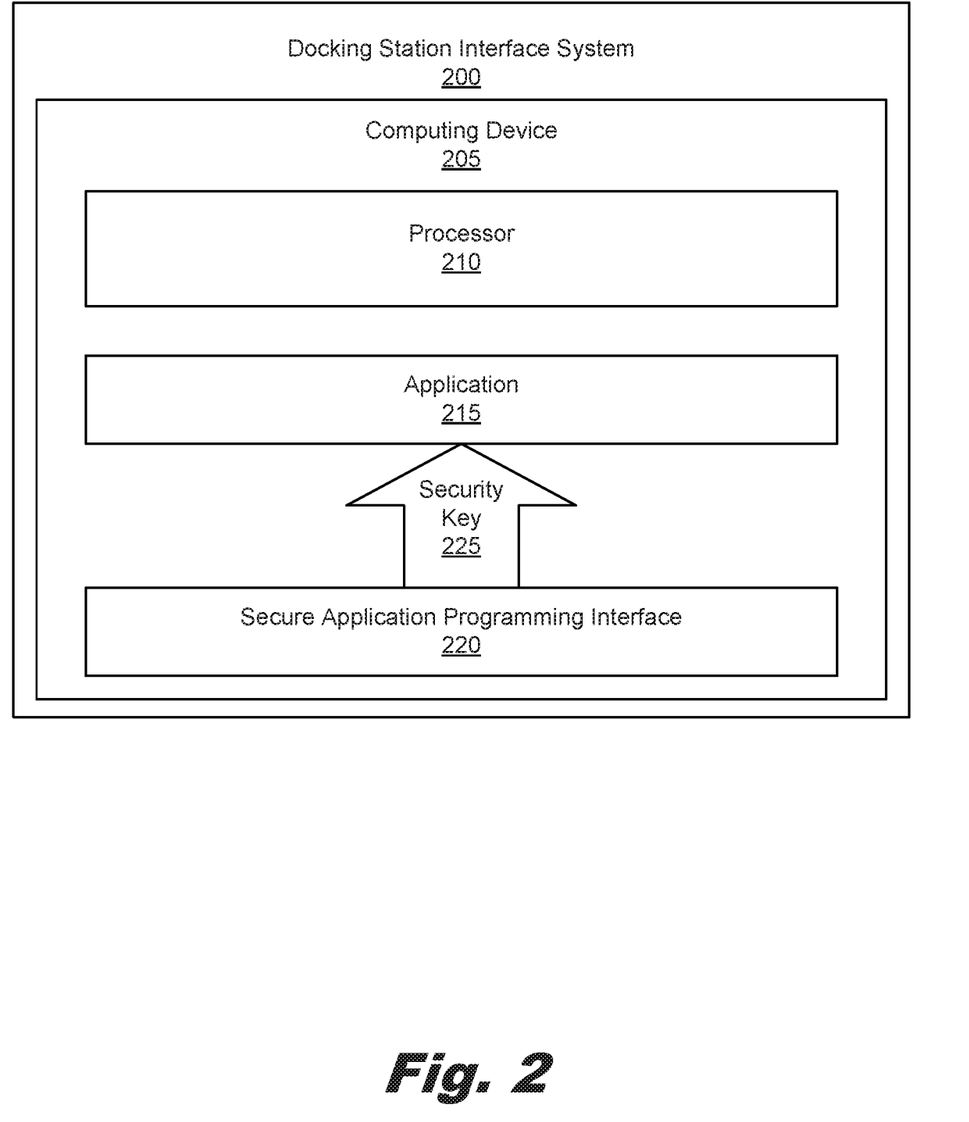
FIG. 2 is a block diagram of a docking station interface system according to an example of the principles described herein.

FIG. 2 is a block diagram of a docking station interface system (200) according to an example of the principles described herein. The docking station interface system (200) may include a computing device (205) that executes, via a processor (210), a secure application programming interface (API) (220) and an application (215) as described herein. The computing device (205) may be any type of computing device such as a server, a desktop computer, a laptop computer, a personal digital assistant (PDA), a mobile device, a smartphone, a gaming system, and a tablet, among other types of computing devices.

The computing device (205) may be utilized in any data processing scenario including, stand-alone hardware, mobile applications, through a computing network, or combinations thereof. Further, the computing device (205) may be used in a computing network, a public cloud network, a private cloud network, a hybrid cloud network, other forms of networks, or combinations thereof. In one example, the methods provided by the computing device (205) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application programming interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the computing device (205) and docking station interface system (200) are executed by a local administrator.

To achieve its desired functionality, the computing device (205) may include various hardware components. Among these hardware components may be any number of processors including the processor (210) of the computing device (205), a number of data storage devices, a number of peripheral device adapters, and a number of network adapters. These hardware components may be interconnected through the use of a number of busses and/or network connections. In one example, the processor (210), data storage device, peripheral device adapters, and a network adapter may be communicatively coupled via a bus.

The processor (210) may include the hardware architecture to retrieve executable code from the data storage device and execute the executable code. The executable code may, when executed by the processor (210), cause the processor (210) along with the application (215) and secure API (220) to implement at least the functionality of creating (105) a security key between a security application programming interface (API) and an application executed on the computing device; upon logging into and execution of a basic input/output system (BIOS) of the computing device by a user, registering (110) the application with the security API using the security key; and, upon receipt of a request to remove the computing device from the docking station, validating (115) the user is authorized to remove the computing device from the docking station based on settings associated with the application, according to the methods of the present specification described herein. In the course of executing code, the processor (210) may receive input from and provide output to a number of the remaining hardware units.

The data storage device may store data such as executable program code that is executed by the processor (210) or other processing device. As will be discussed, the data storage device may specifically store computer code representing a number of applications that the processor (210) executes to implement at least the functionality described herein.

The data storage device may include various types of memory modules, including volatile and nonvolatile memory. For example, the data storage device of the present example includes Random Access Memory (RAM), Read Only Memory (ROM), and Hard Disk Drive (HDD) memory. Many other types of memory may also be utilized, and the present specification contemplates the use of many varying type(s) of memory in the data storage device as may suit a particular application of the principles described herein. In certain examples, different types of memory in the data storage device may be used for different data storage needs. For example, in certain examples the processor (210) may boot from Read Only Memory (ROM), maintain nonvolatile storage in the Hard Disk Drive (HDD) memory, and execute program code stored in Random Access Memory (RAM).

The data storage device may comprise a computer readable medium, a computer readable storage medium, or a non-transitory computer readable medium, among others. For example, the data storage device may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters in the computing device (205) enable the processor (210) to interface with various other hardware elements, external and internal to the computing device (205) and docking station interface system (200). For example, the peripheral device adapters may provide an interface to input/output devices, such as, for example, display device, a mouse, or a keyboard. The peripheral device adapters may also provide access to other external devices such as an external storage device, a number of network devices such as, for example, servers, switches, and routers, client devices, other types of computing devices, and combinations thereof.

The display device may be provided to allow a user of the docking station interface system (200) to interact with and implement the functionality described herein. The peripheral device adapters may also create an interface between the processor (210) and the display device, a printer, or other media output devices. The network adapter may provide an interface to other computing devices within, for example, a network, thereby enabling the transmission of data between the computing device (205) and/or docking station interface system (200) and other devices located within the network.

As described herein, the computing device (205) may execute, via the processor (210), a secure API (220) in order to create a security key (225) between the secure API (220) and the application (215) being executed. the security key (225) allows the secure API (220) to communicate with, securely transmit setting data, and provide authorization to the processor (210) of the computing device (205) as described herein. In a specific example, the communication and transmission of the settings to the processor (210) allow a user to be selectively allowed or prevented from removing the computing device (205) from a docking station. In an example, the communication and transmission of the settings to the processor (210) allows for an administrator of the computing device (205) to set if a user may detach the computing device (205) from the docking station, to which docking stations the user may couple the computing device (205) to, and what ports (and, in turn, associated peripherals) associated with the computing device (205) and/or docking station the user may have authorization to access. All of this authorization or revocation of such authorization may be on an application-by-application (settings-by-settings) basis. That is, the authorization of a user to either detach the computing device (205) or access ports may be based on the currently executed application (215) on the computing device (205) and its associated settings as described herein.

As described herein, when the secure API (220) has communicated with the application (215) via the use of the security key (225), a request to remove the computing device (205) from the docking station may be received by the processor (210). This request may be either from the application (215) itself or from the actuation of a button located on the docking station. In any example, however, the processor (210) may be provided authorization data from the secure API (220) indicating whether the computing device (205) may be removed. Again, in an example, authorization may be dependent on the user logged into the computing device (205) and/or application (215); authorization may be dependent on the settings associated with any particular application (215) being executed; or authorization may be dependent a combination of these criteria.

In any example presented herein, the data storage device may receive data descriptive of the status of the computing device, the status and/or identification of the docking station, and/or the status of the computing device relative to the docking station. This data may include data descriptive of the docked state of the computing device (205) relative to the docking station such as "docked," "not docked," or "docking jam." This data may include data descriptive of the locked state of the computing device (205) relative to the docking station such as "unlocked," or "locked." This data may include data descriptive of an identification of or serial number associated with any given docking station. This data may include data descriptive they type of docking station the computing device (205) is coupled to such as whether the docking station is a retail hub communicatively coupled to a cash drawer and whether the ports associated with the cash drawer is "enabled" or "disabled." Any other data associated with any of the application (215), computing device (205), and/or docking station may also be maintained on the data storage device and the present specification contemplates the storage of these other types of data.

Figure 3:
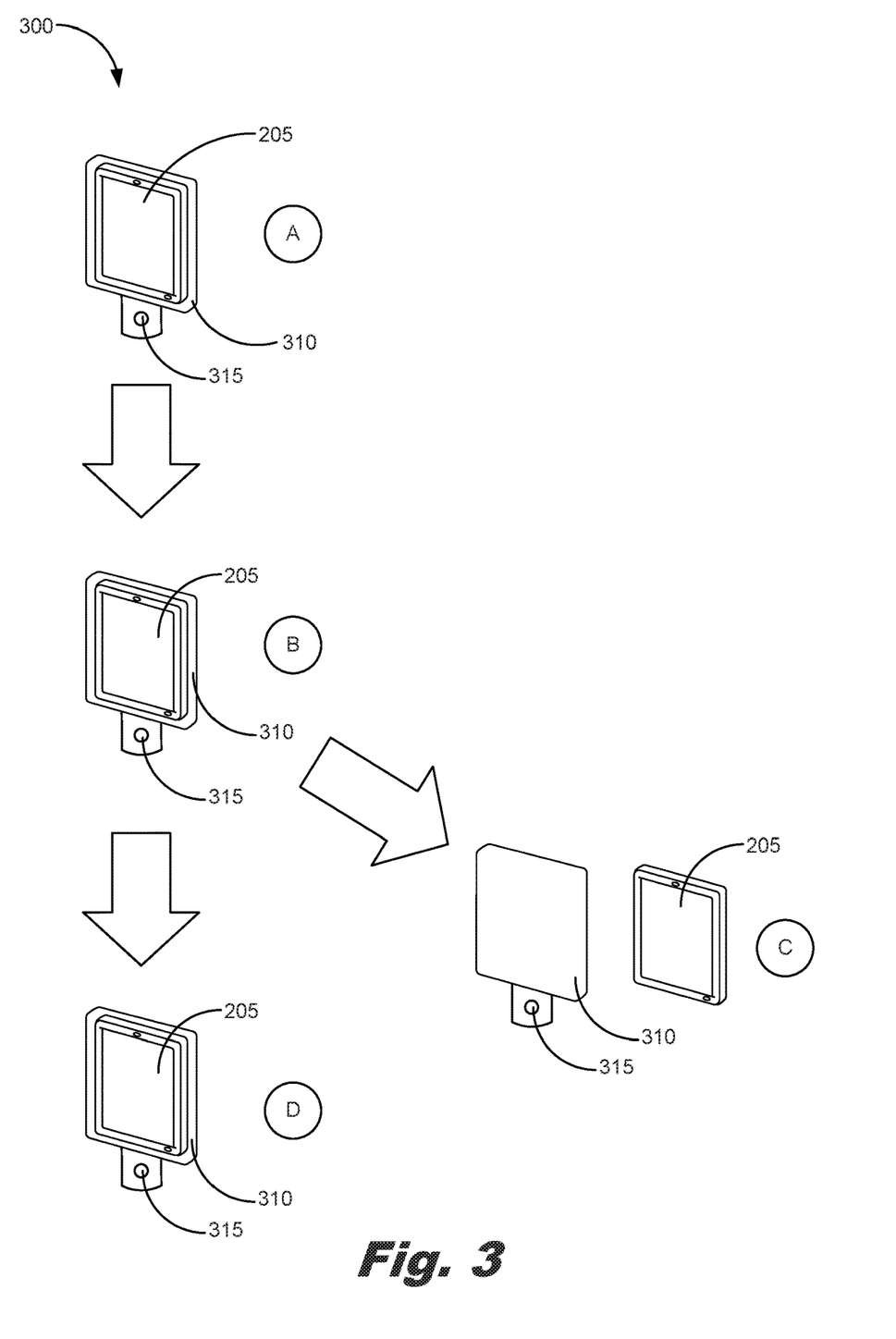
FIG. 3 is a diagram depicting a process flow descriptive of the removal of a computing device from a docking station according to an example, of the principles described herein.

FIG. 3 is a diagram depicting a process flow (300) descriptive of the removal of a computing device (205) from a docking station (310) according to an example, of the principles described herein. At a first diagram indicated by the circled "A," a user may have powered up the computing device (205) secured to the docking station (310). The user may have logged into the operating system (OS) of the computing device (205) causing the BIOS of the computing device (205) to cause the secure API (220) to create the security key (225) with any given application (215) executable by the processor (210).

In this example, the docking station (310) may include a button (315) used to send a signal to the processor (210) of the computing device (205) indicating that the user is attempting to decouple the computing device (205) from the docking station (310). This button (315) may have a light emitting diode (LED) or series of LEDS that indicate a status of the process. In an example, each of the diagrams indicated by the circles in FIG. 3 may be indicated by a different color of LED thereby indicating the process flow described in FIG. 3.

After the application (215) has been registered with the secure API (220) and the user has actuated the button (315) (indicated in diagram circle "B"), a signal may be sent to the secure API (220) requesting information associated with the settings of the application (215) being executed. Based on the settings of the application (215) as described herein, the process may proceed to either allow for removal of the computing device (205) from the docking station (310) (circle "C") or rejection of the request to remove the computing device (205) from the docking station (310) (circle "D"). Again, the LEDs associated with the button (315) may indicate these two states visually via, for example, changing to a new color.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (210) of the computing device (205) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a computing device and docking station system that provides additional functionality and security when the computing device is attempted to be removed from the docking station. Based on the application being executed on the computing device, the user may be selectively allowed or prevented from removing the computing device from the docking station. Additionally, the user may be selectively allowed or prevented from accessing ports associated with either the computing device or docking station such as an electrical cash drawer used in connection with a POS application being executed on the computing device.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of selectively securing a computing device at a docking station, comprising:
   creating a security key between a security application programming interface (API) and an application executed on the computing device;
   upon logging into and execution of a basic input/output system (BIOS) of the computing device by a user, registering the application with the security API using the security key;
   upon receiving a first request to remove the computing device from the docking station;
      validating first authorization of the user to remove the computing device from the docking station using first settings associated with the application, wherein the first settings associated with the application include conditions associated with removing the computing device from the docking station;
      upon validating the first authorization of the user to remove the computing device from the docking station, determining that the conditions associated with removing the computing device from the docking station have been satisfied; and
      upon determining that the conditions associated with removing the computing device from the docking station have been satisfied, enabling removal of the computing device from the docking station; and
   upon receiving a second request to access a universal serial bus (USB) port associated with the computing device;
      validating second authorization of the user to access the USB port using second settings associated with the application, wherein the second settings associated with the application include conditions associated with accessing the USB port;
      upon validating the second authorization of the user to access the USB port, determining that the conditions associated with accessing the USB port have not been satisfied; and
      upon determining that the conditions associated with accessing the USB port have not been satisfied, disabling access to the USB port.

2. The method of claim 1, wherein signals are sent to the docking station causing a number of distinct lights to be illuminated upon validating the user.

3. The method of claim 1, wherein upon removal of the computing device from the docking station, the security API signals to the application that the computing device has been removed from the docking station.

4. The method of claim 1, wherein the execution of the application at the docking station via the user incorporates the first settings and the second settings associated with the application.

5. The method of claim 1, wherein the first request to remove the computing device originates from the docking station by actuation of a button on the docking station.

6. The method of claim 5, wherein the actuation of the button on the docking station sends a signal to the security API indicating a request to undock from the docking station has been initiated.

7. The method of claim 1, wherein the first request to remove the computing device from the docking station is initiated by the application.

8. A docking station interface system, comprising:
   a computing device comprising a processor, the computing device selectively and physically couplable to a docking station;
   an application executed by the processor; and
   a secure application programming interface (API) to create a security key to be used between the secure API and the application executed by the processor;
   wherein upon logging into and execution of a basic input/output system (BIOS) of the computing device by a user, the secure API registers the application with the secure API using the security key;
   wherein, upon receipt of a first request to remove the computing device from the docking station, the secure API:
      validates first authorization of the user to remove the computing device from the docking station using first settings associated with the application, wherein the first settings associated with the application include conditions associated with removing the computing device from the docking station;
      determines that the conditions associated with removing the computing device from the docking station have been satisfied; and
      enables removal of the computing device from the docking station by unlocking a physical lock connected to the docking station; and wherein, upon receipt of a second request to access a universal serial bus (USB) port associated with the computing device, the secure API:
  validates second authorization of the user to access the USB port using second settings associated with the application, wherein the second settings associated with the application include conditions associated with accessing the USB port;
  determines that conditions associated with accessing the USB port have not been satisfied; and
  disables access to the USB port.

9. The docking station interface system of claim 8, wherein signals are sent to the docking station by the secure API causing a number of distinct lights to be illuminated upon validating the user.

10. The docking station interface system of claim 8, wherein upon removal of the computing device from the docking station, the secure API signals to the application that the computing device has been removed from the docking station.

11. The docking station interface system of claim 8, wherein the execution of the application at the docking station via the user incorporates the first settings and the second settings associated with the application.

12. The docking station interface system of claim 8, wherein the first request to remove the computing device originates from the docking station by actuation of a button on the docking station.

13. The docking station interface system of claim 8, wherein the first request to remove the computing device from the docking station is initiated by the application.

14. A non-transitory computer readable storage medium comprising computer usable program code embodied therewith, the computer usable program code to, when executed by a processor:
  create a security key between a security application programming interface (API) and an application executed on a computing device selectively and physically couplable to a docking station;
  upon logging into and execution of a basic input/output system (BIOS) of the computing device by a user, register the application with the security API using the security key;
  upon receipt of a first request to remove the computing device from the docking station:
    validate first authorization of the user to remove the computing device from the docking station using first settings associated with the application, wherein the first settings associated with the application include conditions associated with removing the computing device from the docking station;
    determine that the conditions associated with removing the computing device from the docking station have been satisfied; and
    enable removal of the computing device from the docking station;
  upon receipt of a second request to access a universal serial bus (USB) port associated with the computing device:
    validate second authorization of the user to access the USB port using second settings associated with the application, wherein the second settings associated with the application include conditions associated with accessing the USB port;
    determine that conditions associated with accessing the USB port have not been satisfied; and
    disable access to the USB port.

15. The non-transitory computer readable storage medium of claim 14, wherein upon removal of the computing device from the docking station, the security API signals to the application that the computing device has been removed from the docking station.

* * * * *